(12) United States Patent
Li et al.

(10) Patent No.: US 11,776,562 B2
(45) Date of Patent: Oct. 3, 2023

(54) CONTEXT-AWARE HARDWARE-BASED VOICE ACTIVITY DETECTION

(71) Applicant: QUALCOMM Incorporated, San Diego, CA (US)

(72) Inventors: Ren Li, San Diego, CA (US); Xiaofei Chen, San Diego, CA (US); Murray Jarvis, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 16/888,522

(22) Filed: May 29, 2020

(65) Prior Publication Data

US 2021/0375306 A1    Dec. 2, 2021

(51) Int. Cl.
*G10L 25/78*    (2013.01)
*G06N 20/10*    (2019.01)
*G06F 17/14*    (2006.01)

(52) U.S. Cl.
CPC ............ *G10L 25/78* (2013.01); *G06F 17/142* (2013.01); *G06N 20/10* (2019.01); *G10L 2025/783* (2013.01)

(58) Field of Classification Search
CPC ... G10L 25/78; G10L 2025/783; G06N 20/10; G06F 17/142
See application file for complete search history.

(56) References Cited

U.S. PATENT DOCUMENTS

| 9,524,726 | B2 * | 12/2016 | Bayer | G10L 19/022 |
| 9,779,755 | B1 * | 10/2017 | Kay | H04L 67/141 |
| 2006/0100866 | A1 * | 5/2006 | Alewine | G10L 15/22 |
| | | | | 704/E15.04 |
| 2011/0020012 | A1 * | 1/2011 | Miyasaka | H04B 10/5053 |
| | | | | 398/202 |
| 2011/0090100 | A1 * | 4/2011 | Shemirani | H01Q 3/40 |
| | | | | 341/100 |
| 2011/0264447 | A1 | 10/2011 | Visser et al. | |
| 2014/0358552 | A1 * | 12/2014 | Xu | G10L 25/78 |
| | | | | 704/275 |
| 2016/0035350 | A1 | 2/2016 | Jung et al. | |
| 2017/0111737 | A1 * | 4/2017 | Painter | H04R 3/002 |

(Continued)

OTHER PUBLICATIONS

Ramirez et al., "Speech/Non-Speech discrimination combining advanced feature extraction and SVM learning" Proceedings of Interspeech, Sep. 17, 2006 (Sep. 17, 2006), pp. 1662-1665 (Year: 2006).*

(Continued)

*Primary Examiner* — Bhavesh M Mehta
*Assistant Examiner* — Edward Tracy, Jr.
(74) *Attorney, Agent, or Firm* — QUALCOMM Incorporated; Espartaco Diaz Hidalgo

(57) ABSTRACT

Certain aspects of the present disclosure provide a method for performing voice activity detection, including: receiving audio data from an audio source of an electronic device; generating a plurality of model input features using a hardware-based feature generator based on the received audio data; providing the plurality of model input features to a hardware-based voice activity detection model; receiving an output value from the hardware-based voice activity detection model; and determining a presence of voice activity in the audio data based on the output value.

28 Claims, 7 Drawing Sheets

(56) References Cited

U.S. PATENT DOCUMENTS

| | | | | |
|---|---|---|---|---|
| 2019/0069074 | A1* | 2/2019 | Yamkovoy | G10K 11/17823 |
| 2020/0279557 | A1* | 9/2020 | Li | G10L 21/0208 |
| 2020/0395042 | A1* | 12/2020 | Hanazawa | G06N 7/005 |
| 2022/0352900 | A1* | 11/2022 | Wuebbolt | H03M 7/4006 |

OTHER PUBLICATIONS

International Search Report and Written Opinion—PCT/US2021/033921—ISA/EPO—dated Oct. 6, 2021.

Javier R., et al., "Speech/Non-Speech Discrimination Combining Advanced Feature Extraction and SVM Learning", Proceedings of Interspeech, Sep. 17, 2006 (Sep. 17, 2006), pp. 1662-1665, XP055836268, Retrieved from the Internet: URL: https://citeseerx.ist.psu.edu/viewdoc/download?doi=10.1.1.99.1261&rep=rep1&type=pdf, Section 3.1, Section 3 .1.1, Figure 1, Equations 6, 7.

Mustiere F., et al., "Efficient SNR-Based Subband Post-Processing for Residual Noise Reduction in Speech Enhancement Algorithms", EUSIPCO 2011, Proceedings of, Aug. 23, 2010 (Aug. 23, 2010), pp. 1558-1561, XP055101329, Retrieved from the Internet: URL: http://www.eurasip.org/Proceedings/Eusipco/Eusipco2 010/Contents/papers/1569293653.pdf [retrieved on Feb. 11, 2014], Figure 3, Section 3.

\* cited by examiner

CONTEXT-AWARE HARDWARE-BASED VOICE ACTIVITY DETECTION

INTRODUCTION

Aspects of the present disclosure relate to power-efficient voice activity detection, and in particular to systems and methods for performing context-aware hardware-based voice activity detection.

Voice activity detection is generally a function implemented by an electronic device in order to activate the device or some function of the device. For example, it may allow a person to give commands to an electronic device, such as a smart speaker, mobile device, wearable device, or the like, without physically interacting with the device directly. Voice activity detection is often implemented as an "always-on" function in electronic devices in order to maximize its utility. Unfortunately, always-on functions require always-on software and/or hardware resources, which in-turn lead to always-on power usage. Mobile electronic devices, internet of things (IoT) devices, and the like are particularly sensitive to such always-on power demands as they reduce battery life and consume other finite resources of the system, such as processing capacity.

Conventionally, voice activity detection has been implemented either as a high-accuracy, high-power function, or a low-accuracy, low-power function owing to the performance constraints of conventional implementations. For example, because of the rigorous power, performance, and area considerations for mobile applications, voice activity detection is often implemented as a low-accuracy, low-power function in mobile devices. Unfortunately, such low-accuracy implementations often leave users frustrated and wanting for better device performance.

Accordingly, what is needed are systems and methods to perform high-accuracy, low-power voice activity detection.

BRIEF SUMMARY

Certain embodiments provide a method for performing voice activity detection, including: receiving audio data from an audio source of an electronic device; generating a plurality of model input features using a hardware-based feature generator based on the received audio data; providing the plurality of model input features to a hardware-based voice activity detection model; receiving an output value from the hardware-based voice activity detection model; and determining a presence of voice activity in the audio data based on the output value.

Additional embodiments provide a processing system configured for performing voice activity detection, including: a memory comprising computer-executable instructions; one or more processors configured to execute the computer-executable instructions and cause the processing system to: receive audio data from an audio source; generate a plurality of model input features using a hardware-based feature generator based on the received audio data; provide the plurality of model input features to a hardware-based voice activity detection model; receive an output value from the hardware-based voice activity detection model; and determine a presence of voice activity in the audio data based on the output value.

Additional embodiments provide a non-transitory computer-readable medium comprising computer-executable instructions that, when executed by one or more processors of a processing system, cause the processing system to perform a method for performing voice activity detection, the method comprising: receiving audio data from an audio source of an electronic device; generating a plurality of model input features using a hardware-based feature generator based on the received audio data; providing the plurality of model input features to a hardware-based voice activity detection model; receiving an output value from the hardware-based voice activity detection model; and determining a presence of voice activity in the audio data based on the output value.

Additional embodiments provide a processing device, comprising: means for receiving audio data from an audio source of an electronic device; means for generating a plurality of model input features using a hardware-based feature generator based on the received audio data; means for providing the plurality of model input features to a hardware-based voice activity detection model; means for receiving an output value from the hardware-based voice activity detection model; and means for determining a presence of voice activity in the audio data based on the output value.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
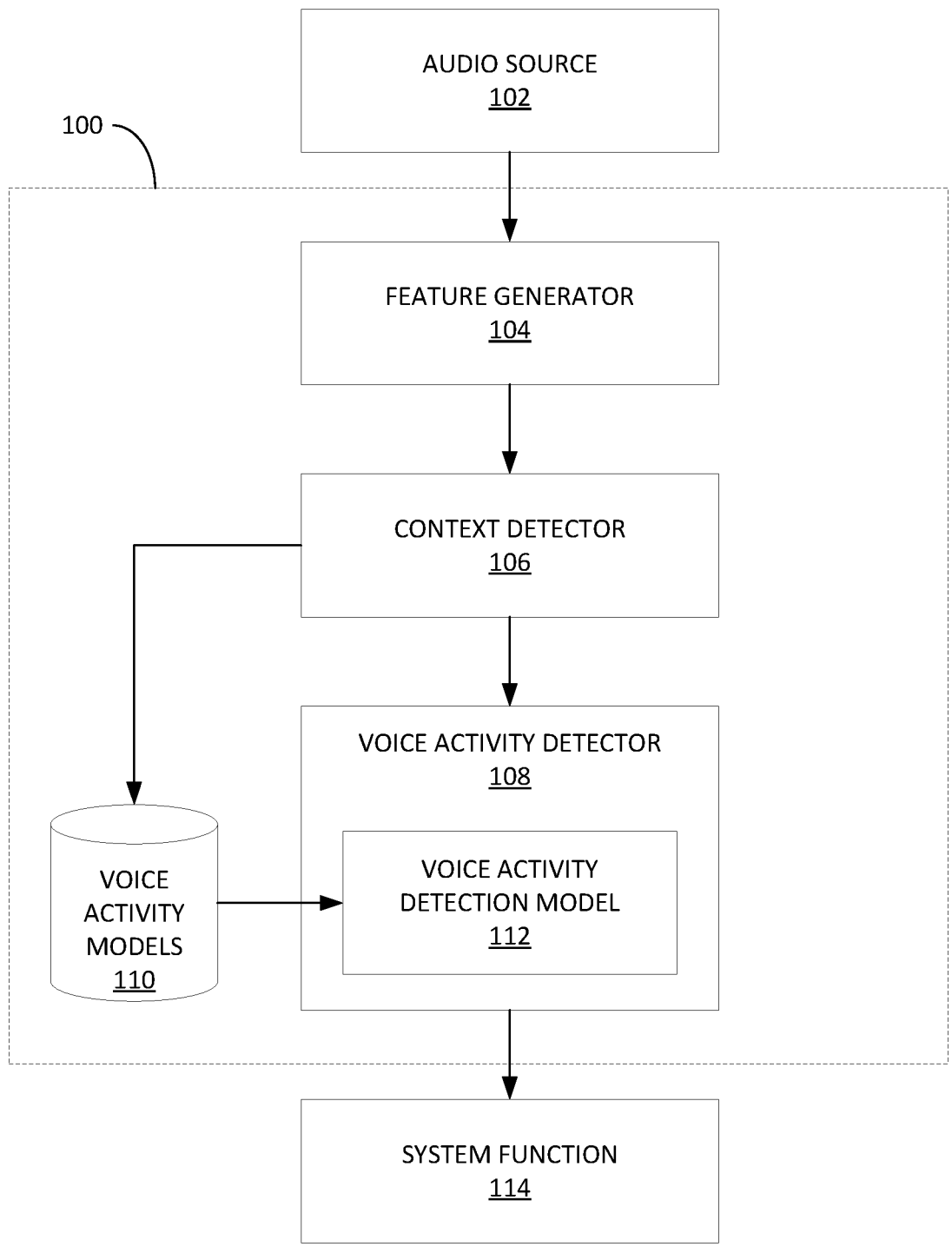
FIG. 1 depicts an example context-aware hardware-based voice activity detection system.

Aspects of the present disclosure provide apparatuses, methods, processing systems, and computer readable mediums for performing voice activity detection with higher accuracy and lower power use than conventional methods.

Voice activity detection generally refers to the discrimination of a human voice by an electronic device in order to perform some function. For example, many consumer electronic devices use voice activity detection, such as by the recognition of specific key words, to "wake" a device, to query a device, and to cause the device to perform various other functions. Voice activity detection can also be used in more complex functionalities, such as "far field" voice detection (e.g., from a mobile device placed across a room), user identify verification (e.g., by voice signature), voice detection during other audio output (e.g., detecting a voice command while playing back music on a device or detecting an interrupting command while a smart assistant is speaking), and voice interaction in complex noise environments, such as within moving vehicles. These are just a few examples, and many others are possible.

Voice activity detection, like various other processing tasks on electronic devices, requires power and dedicated hardware and/or software to function. Further, voice activity detection is generally implemented as an "always-on" function to maximize its utility to users of electronic devices with voice activated functionality. For devices that are always plugged in, the power usage of always-on voice activity detection functionality is primarily an efficiency consideration, but for power sensitive devices (e.g., mobile electronic devices, IoT devices, and the like) with always-on voice activity functionality, the considerations are more complex. For example, power use from always-on functions can limit the run-time of such devices and reduce capacity for other system processing requirements. Moreover, hardware related to voice activity detection can consume valuable and limited space on chips within mobile electronic devices, which cannot then be used for other functionalities.

There are generally two types of voice activity detection implementations: hardware-based voice activity detection and software-based voice activity detection.

Hardware-based voice activity detection generally uses hardware-implemented circuits to analyze an incoming audio signal for a voice presence, such as by using circuitry for signal-to-noise ratio (SNR) detection. Unfortunately, conventional hardware-based voice activity detection exhibits poor accuracy (e.g., high false-positive and false-negative rates) for non-stationary audio signals. Consequently, such implementations tend to have performance that is very sensitive to the type of incoming audio (e.g., noise), and thus perform irregularly across different noise environments (such as in a quiet room, on a busy street, or in a moving vehicle, to name a few examples). Further, even when an incoming audio signal has high SNR, conventional hardware-based systems still suffer poor accuracy (e.g., in terms of false positive and false negative rates) due to the highly non-stationary noise environments.

Software-based voice activity detection generally uses software-implemented models to analyze an incoming audio signal for a voice presence. For example, various software-based preprocessing steps may generate input data for a machine learning model, such as a deep neural network model, which is then used to detect a voice in an audio signal through inference. While software-based voice activity detection systems achieve higher accuracy than conventional hardware-based systems, in large part due to their ability to run state of the art, re-trainable detection models, they require more complex and power-hungry processing hardware, such as specialized digital signal processors (DSPs), machine learning accelerators, artificial intelligence processing cores, and the like. Even using standard processing units to run software-based models generates significantly higher power usage than conventional hardware-based voice activity detection systems. Thus, high-power software-based voice activity detection systems are generally not an ideal option for power-sensitive devices, such as mobile electronic devices and other edge processing devices.

Embodiments described herein overcome the shortcomings of conventional solutions by utilizing a hardware-based voice activity detection design including an efficient feature compressing front-end that feeds an efficient hardware-based machine learning model back-end.

In particular, embodiments described herein use a fast Fourier transform (FFT) to generate a compact multi-band feature vector, which in turn enables a multi-band signal-to-noise ratio (SNR) determination based on multi-band minimum statistics (e.g., noise floor determinations). The use of compact FFT output (e.g., a 16-band (or point or channel) output) compared to conventional software-based methods that much larger outputs (e.g., 512-band), enables a smaller model size and smaller data size, which reduces physical (hardware) model implementation space, memory requirements, and power requirements.

Further, embodiments described herein use a hardware-based machine learning model back-end, which enables more robust voice activity detection than a conventional hardware-based SNR threshold detection scheme.

Further yet, embodiments described herein implement a context-awareness to further improve voice detection accuracy. In some embodiments, context-awareness allows determination of a specific background noise type so type-specific model parameters can be loaded into the hardware-based machine learning model backend for improved voice activity detection accuracy.

Thus, embodiments described herein achieve the best of both conventional solution types; namely, software implementation-level accuracy at hardware implementation-level power efficiency.

Example Context-Aware Hardware-Based Voice Activity Detection System

FIG. 1 depicts an example context-aware hardware-based voice activity detection system 100.

System 100 receives audio signals (e.g., PCM audio data from an analog mic, PDM high definition audio from a digital mic, and the like) from an audio source in an electronic system. For example, the audio signals could be generated by one or more microphones of an electronic device, such as a mobile electronic device, smart home device, internet of things (IoT) device, or other edge processing device.

The received audio signals are processed by a feature generator 104. Feature generator 104 may be, for example, a hardware-implemented Fourier transformation, such as a fast Fourier transformation (FFT) function or circuit. A Fourier transform is generally a function for deconstructing a time domain representation of a signal, such as the received audio signals, into a frequency domain representation. The frequency domain representation may include voltages or powers present at varying frequencies in the received audio signals. An example embodiment of feature generator 104 is described in more detail with respect to FIG. 2. Notably, other or additional forms of feature generation may be used in other embodiments.

The features generated from the audio signals from audio source 102 by feature generator 104 are then processed by context detector 106. In this example, a context may refer to a predefined or pre-characterized audio environment, such as a quiet room, a busy street, an office environment, an aircraft, and automobile, a shopping center, a concert, and the like. In some embodiments, a context is determined (e.g., by a maximum likelihood estimate or simple threshold comparison using sum and delta change of FFT features) based on the features generated by feature generator 104. An example method for context detection is described in more detail below with respect to FIG. 6.

The determined context is used by voice activity detector 108 to load a context-specific voice activity model, such as may be stored in voice activity model repository 110, which may be stored in a memory of an electronic device in some embodiments.

A context-specific voice activity model may generally improve voice activity detector 108's ability to accurately identify a voice in the received audio signals. Notably, in some embodiments, context detector 106 may not be present, or context detector 106 may not determine a context, in which case voice activity detector 108 may use a base or default voice activity detection model instead of a context-specific model.

Voice activity detector 108 uses voice activity detection model 112 to determine whether the received audio signal includes voice activity. As above, a voice activity may include the presence of a human voice in an audio signal, and may further include one or more keywords, a statement that is parsed with a natural language engine, or the like. In some cases, voice activity detector 108 may use a multi-stage voice activity detection model 112.

Once voice activity detector 108 determines voice activity in the received audio signal, it generates a signal for another system function 114. For example, a keyword in the detected voice activity may cause an application to launch, or another part of the electronic device to wake up (e.g., a screen, other processor, or other sensor), or a query to be run locally or at a remote data service, and the like. In some embodiments, system function 114 may only receive an indication that voice activity has been detected, while in other embodiments, system function 114 may receive additional information, such as information specific to the detected voice activity, such as one or more detected keywords in the voice activity. Notably, there may be additional functions (not shown) between voice activity detector 108 and system function 114, such as additional stages of voice activity detection or analysis.

Figure 2:
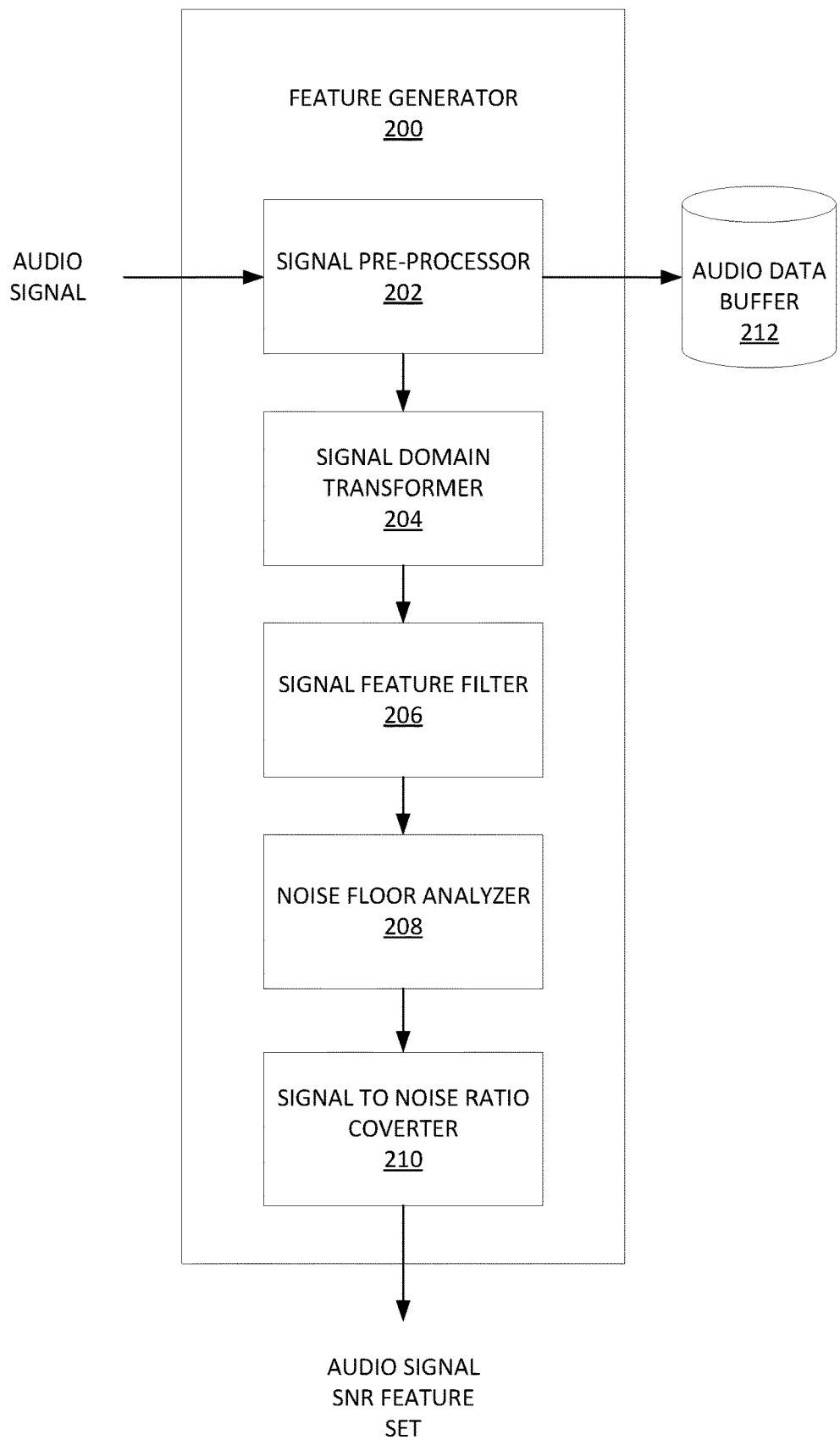
FIG. 2 depicts an example embodiment of a feature generator.

FIG. 2 depicts an example embodiment of a feature generator 200, which may be implemented as feature generator 104 of FIG. 1.

Feature generator 200 receives an audio signal at signal pre-processor 202. As above, the audio signal may be from an audio source of an electronic device, such as a microphone.

Signal pre-processor 202 may perform various pre-processing steps on the received audio signal. For example, signal pre-processor 202 may split the audio signal into parallel audio signals and delay one of the signals by a predetermined amount of time to prepare the audio signals for input into an FFT circuit.

As another example, signal pre-processor 202 may perform a windowing function, such as a Hamming, Hann, Blackman-Harris, Kaiser-Bessel window function, or other sine-based window function, which may improve the performance of further processing stages, such as signal domain transformer 204. Generally, a windowing (or window) function in may be used to reduce the amplitude of discontinuities at the boundaries of each finite sequence of received audio signal data to improve further processing.

As another example, signal pre-processor 202 may convert the audio signal data from parallel to serial, or vice versa, for further processing.

Figure 3:
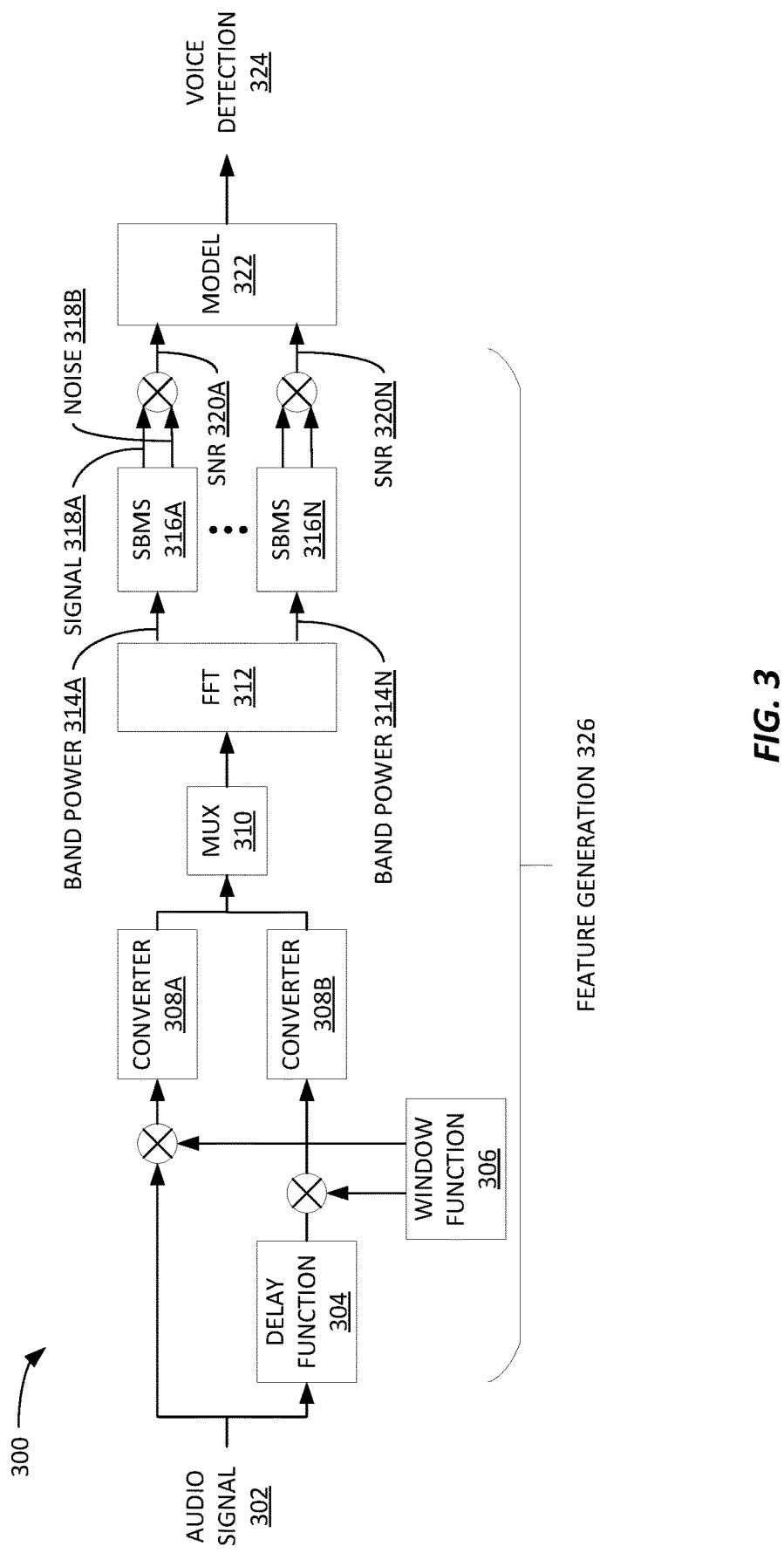
FIG. 3 depicts a high-level block diagram of a Multi-Channel Minimum Statistic (MCMS) voice activity detection (VAD) circuit
Figure 4:
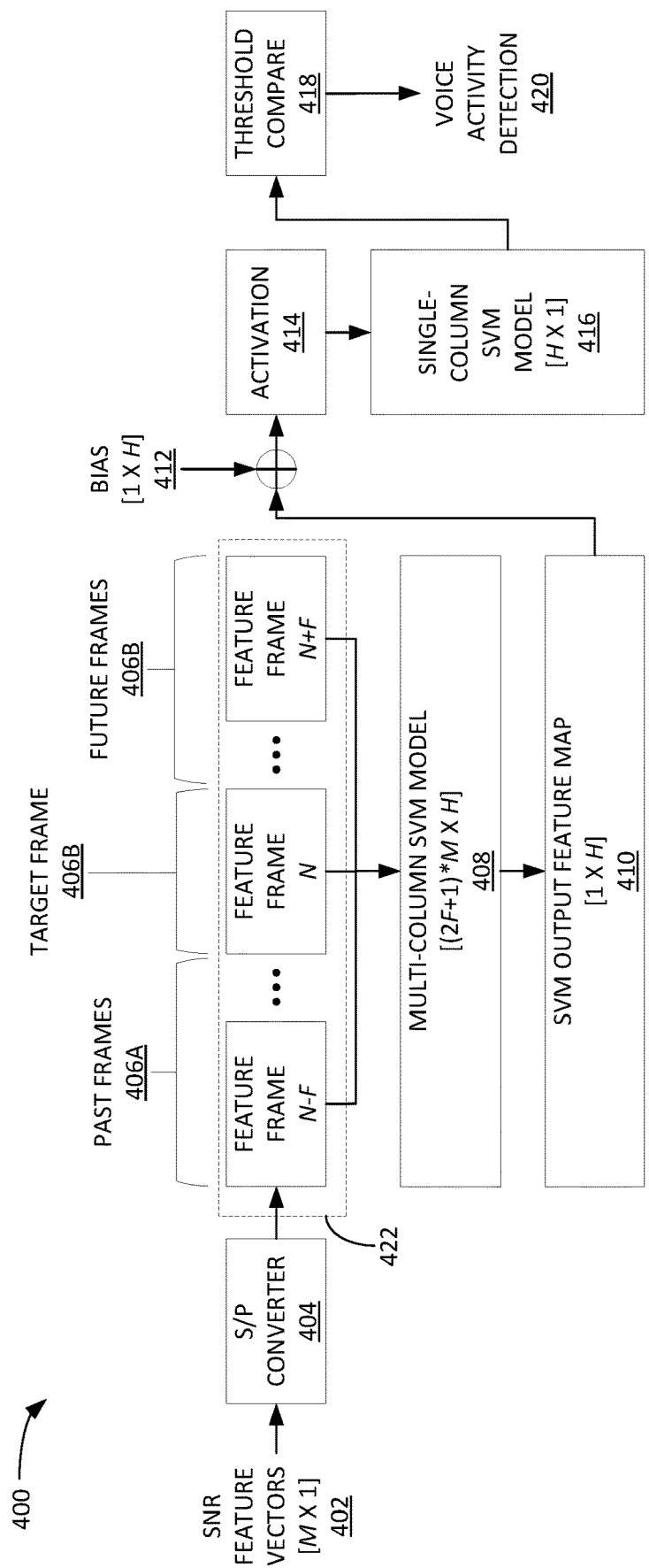
FIG. 4 depicts an example inferencing signal flow for a voice activity detection model.
Figure 5:
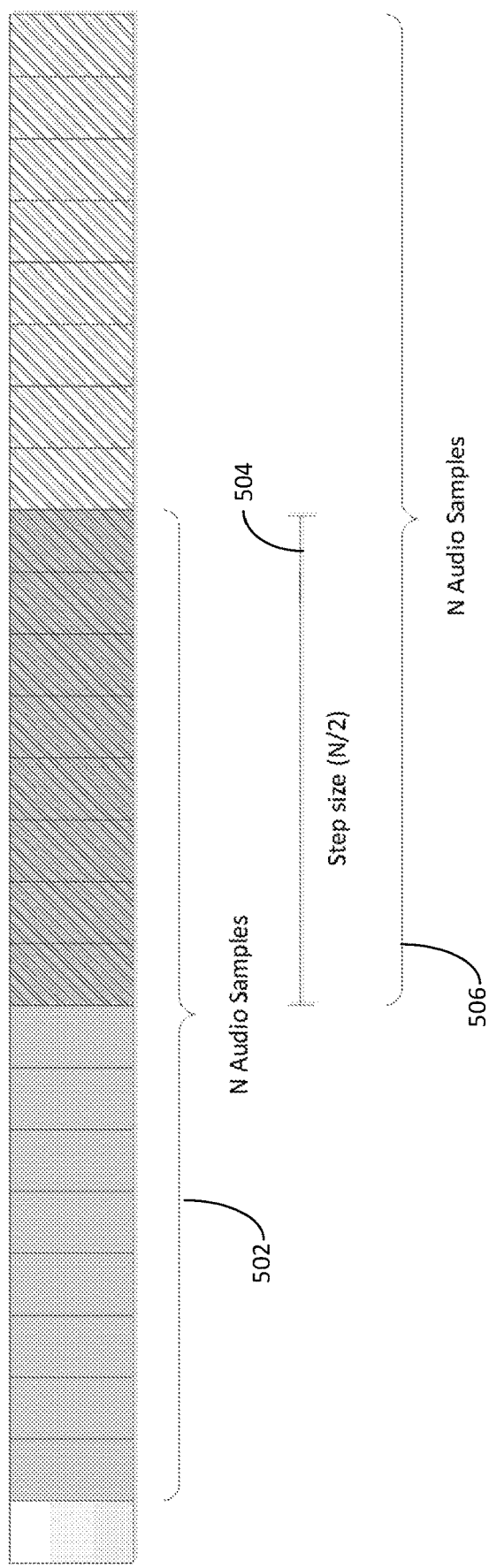
FIG. 5 depicts an example sampling method for context detection in audio data.

The pre-processed audio signal is then provided to an audio data buffer 212, which may hold audio data pending a voice activity detection, and then share the data with additional processing stages if voice activity is detected, such as further described with respect to FIGS. 3-5.

The pre-processed audio signal is also provided to signal domain transformer 204, which is generally configured to transform the pre-processed audio signal from a first domain into a second domain, such as from a time domain into a frequency domain.

In some embodiments, signal domain transformer 204 implements a Fourier transformation, such as a fast Fourier transformation. For example, in some embodiments, the fast Fourier transformation may be a 16-band (or bin, channel, or point) fast Fourier transform, which generates a compact feature set that may be efficiency processed by a model. Beneficially, a Fourier transform provides fine spectral domain information about the incoming audio signal as compared to conventional single channel processing, such as conventional hardware SNR threshold detection.

The result of signal domain transformer 204 is a set of audio features, such as a set of voltages, powers, or energies per frequency band in the transformed data.

The set of audio features is then provided to signal feature filter 206, which is configured to reduce the size of or compress the feature set in the audio feature data. In some embodiments, signal feature filter 206 may be configured to discard certain features from the audio feature set, such as symmetric or redundant features from multiple bands of a multi-band fast Fourier transform. Discarding this data reduces the overall size of the data stream for further processing, and may be referred to a compressing the data stream.

For example, in some embodiments, a 16-band FFT may include 8 symmetric or redundant bands of after the powers are squared because audio signals are real. Thus, signal feature filter 206 may filter out the redundant or symmetric band information.

The filtered audio feature set is then provided to noise floor analyzer 208, which may be configured to determine a minimum statistic for each feature in the audio feature set.

In some embodiments, noise floor analyzer 208 is configured as a buffer with bins for a predetermined number of individual features from which a minimum value observation (e.g., a minimum statistic) can be determined over the course of a predetermined number of observations or frames of audio data. These minimum values for each feature of the filtered audio feature set may comprise a noise floor feature set, which may be used in subsequent processing to determine a signal to noise ratio.

The filtered audio feature set and the noise floor feature set are then provided to signal-to-noise ratio converter 210, which is configured to determine a signal to noise ratio based on the feature sets. In some embodiments, this conversion is performed using a logarithmic function, such as a log base 10 function. A log function may beneficially compress the feature range so that further processing is more efficient. Further, the log function may beneficially reduce or avoid computationally expensive division operations by converting the division into a computationally less expensive subtraction (e.g., in which the log values of the numerator and denominator are subtracted from each other to get a value equivalent to the division operation).

FIG. 3 depicts a high-level block diagram of a Multi-Channel Minimum Statistic (MCMS) voice activity detection (VAD) circuit 300, which may be implemented as hardware in an electronic device. VAD circuit 300 may be an example of a voice activity detector 108 as in FIG. 1.

Audio signal 302 may be, for example, 16 kHz PCM data. The audio signal data is initially split with one leg going to a delay buffer 304. In some embodiments, delay buffer 304 is configured to generate a 50% delay in the audio signal data. For example, if an audio signal has 16 samples, then a 50% delay would offset the signal by 8 samples, such as shown in the example of FIG. 5.

In one embodiment, the incoming 16 kHz PCM signal is grouped into 16-by-1 vectors with step size 8 (i.e., 50% overlap), or in other words, 16 PCM samples after windowing and overlap and adding.

Both the original and delayed leg of audio signal 302 are then processed by window function 306 and then passed to converters 308A and 308B, respectively. In some embodiments, the window function is a sine window function, such as a Hamming or Hann window function. Further, in this embodiment, converters 308A and 308B are serial to parallel (S/P) converters, which covert the serial data streams into parallel data streams.

The windowed and converted data streams (e.g., vectors) are then provided to mux 310, which combines the data streams for input into fast Fourier transformer (FFT) 312. Generally, FFT 312 is a circuit configured to generate power data for a plurality of individual frequency bands; in other words, a hardware-based FFT circuit.

In one embodiment, FFT 312 is a 16-band FFT engine with 50% overlap due to delay buffer 304. In such an embodiment, FFT 312 decomposes the input signal into a plurality of frequency bands with determined power values for each band. Notably, because the input audio signal in this example is always real, the absolute values of the FFT outputs from FFT 312 are symmetric. Thus, in this example, the repeated bands are filtered out and only 8 out of 16 bands (i.e., 314A-314N, where N=8) are preserved for subsequent processing.

In the example where input audio signal 302 is 16 kHz PCM data with 50% overlap via delay buffer 304, and FFT 312 is a 16-band transform, the output sampling rate at each FFT output port is 16 kHz/16 band FFT/0.5 overlap=2 kHz.

The individual band powers 314A-N are then provided to single band minimum statistic (SBMS) blocks 316A-N, which are configured to determine the signal power level (e.g. 318A) and the noise floor power level (318B) with respect to each individual power band 314A-N.

In one embodiment, the input to SBMSs 316A-316N are the magnitude squared outputs for the individual band powers 314A-N determined by FFT 312. The magnitude squared FFT outputs allow easy determination of duplicative band values. In the example where FFT 312 is configured to output 8 individual bands 314A-N, then there are 8 corresponding SBMS blocks (316A-N). In one embodiment, the output signal's sampling rate for each SBMS block is 100 Hz or 10 ms per sample.

Each SBMS block 316A-N may be configured to calculate signal power using, for example, an integrate and dump circuit. In such an example, the input signal from FFT 312 is first magnitude squared and then accumulated for C cycles, where C gives a desired frame rate. Thus, for a 2 kHz input rate, and 10 ms frame rate, C is 20.

Each SBMS block 316A-N may further be configured to output Log base 10 signal power and Log base 10 noise power, the difference of which gives individual band Log signal-to-noise ratios (SNRs) 320A-320N. These SNR values are then fed into model 322 for a final determination of voice activity in audio signal 302.

In other embodiments, other measures may be used as input to model 322. For example, in some cases, only the signal component (e.g., 318A) may be provided to model 322, and the signal component may be compared to a baseline noise floor or constant.

In one embodiment, model 322 is a multi-column support vector machine (SVM) model and a voice activity detection decision is made for every individual FFT band. In other embodiments, model 322 may be a single-column SVM for lower power applications.

Notably, in this embodiment, model 322 is implemented in hardware. The parameters for model 322 may be stored in a memory (not depicted) and loaded. As above in FIG. 1, model 322 may load different model parameters (e.g., weights and biases) based on different contexts determined for audio signal 302.

FIG. 4 depicts an example inferencing signal flow 400 for a voice activity detection model, such as model 322 in FIG. 3.

Initially feature vectors with M signal to noise ratios (SNRs), or Log SNRs, per vector (such as those output by SBMCs 316A-N in FIG. 3) are provided to a serial to parallel data converter 404. Converter 404 takes the multi-dimensional vector inputs and outputs a set of feature frames, which includes a target feature frame 406B, F past feature frames 406A, and F future feature frames 406C, to an input feature buffer 422. Here, "past" and "future" are relative terms based on the target feature frame. Thus, in this example, there are 2F+1 total frames in the input feature space, and each frame (e.g., 406) has M observations.

The feature frames 406 are provided to multi-column SVM model 408, which is of size (2F+1)*M-by-H, where H is the number of outputs from multi-column SVM model 408 (e.g., the number of nodes in the output layer). Notably, in other examples, SVM model 408 may be replaced by other types of machine learning models, such as a neural network model. In this example, multi-column SVM model 408 is implemented in hardware. In some embodiments, weights and biases for model 408 may be static, while in others, the weights and biases may be loaded dynamically, e.g., from a memory, such as described above with respect to FIG. 1.

Multi-column SVM model 408 outputs a feature map 410 of size 1-by-H in the depicted example. Feature map 410 then has a 1-by-H set of biases applied by bias operator 412 before being processed by activation function 414. In some embodiments, activation function 414 is a non-linear activation function, such as ReLU.

The activation outputs are then passed to an H-by-1 single-column SVM model 416, which outputs a 1-by-1 scalar value in this example. The scalar value is then compared to a threshold to determine whether any voice activity is detected (or not) in the featurized audio signals 402. For example, if the scalar value is greater than or equal to the threshold, then voice activity is detected, and if the scalar value is less than the threshold, then no voice activity is detected, or vice versa.

Thus, inferencing signal flow 400 may be described as a multi-layer perceptron model comprised of, in this example, two layers of SVM models.

In one example, a feature generation block, such as described above, outputs an 8-by-1 SNR vector every 10 ms frame. The frames are then fed into a frame tapped delay line to stack 21 frames (10 past frames, one target frame, and 10 future frames) before being fed to a 168-by-20 SVM matrix (e.g., 21-frames of SNRs*8 features=168), which operates like a polyphase interpolator. Generally, a polyphaser interpolator takes a signal stream and performs up-sampling (interpolation) with a polyphase filter bank (e.g., a filter bank which splits an input signal into a given number of equidistant sub-bands). The framing of features beneficially includes more audio context (history) info in the input data stream and increases the feature size.

The SVM matrix is applied to the input data to generate a 1-by-20 vector for every frame. The 1-by-20 vector is then added to a fixed 1-by-20 bias vector. After this, a non-linear activation function (e.g., ReLU) is used to create activations and to add nonlinearity to the detection system. Finally, a voice activity detection is made by applying a 20-by-1 single-column SVM model to the activations to generate a scalar output that can be compared to a threshold.

Thus, in this example, 21 total frames of data are used to make a single voice activity detection, including 10 past feature frames (e.g., 406A), 10 future feature frames (e.g., 406C), and a single target feature frame for voice activity detection (e.g., 406B). In this way, model column SVM model 408 processes the signal before and after the target frame (decision point) and effectively makes a joint decision based these frames.

Example Context Detection Method

A beneficial aspect of contextual awareness is classification of an audio scene and audio events or the change of the same. As described above, when a context is determined, a set of context-specific model parameters may be loaded into a model, such as the voice activity models discussed with respect to FIGS. 1 (112), 3 (322), and 4 (400).

In one embodiment, a context detection method buffers N audio samples and then performs a domain transformation (e.g., FFT) on the buffered samples to obtain a signal power spectrum. The method then steps forward N/2 samples and repeats the domain transformation, as depicted in FIG. 5. In particular, FIG. 5 depicts a first selection 502 of N audio samples, a step size 504 of N/2 audio samples, and then a second selection 506 of N audio samples, in which half are overlapped with the first step.

In some embodiments, additional filtering may be applied on the spectral coefficients. In some embodiments, N may be relatively small, such as 16, 8 or even 4.

In some embodiments, each domain transformation of N samples is performed using an FFT and the square of the absolute values of the coefficients is taken to obtain spectral coefficients according to:

$$S_{t,m} = \left| \sum_{n=0}^{N-1} X_{t,n} e^{2\pi i n m/N} \right|^2$$

The spectral coefficients $S_{t,m}$ may then be filtered. For example, a coefficient of $\alpha=1-N/2048$ may be used in some embodiments, which corresponds to a ½ life decay for the filter of about $1/20^{th}$ of a second when using an input audio data of 16 k samples per second. This may be represented as:

$$\gamma_{t,m} = \alpha \gamma_{t-1,m} + (1-\alpha) S_{t,m},$$

where $\gamma_{t,m}$ is a filtered spectral coefficient.

The result of the filtering may then be converted to decibel values according to:

$$\Gamma_{t,m} = 10 \log_{10} \gamma_{t,m}$$

where $\Gamma_{t,m}$ is a Decibel value for a filtered spectral coefficient.

Then, a total energy $E_t$ may be determined, which is the sum of the filtered spectral coefficients, according to:

$$E_t = 10 \log_{10} \Sigma \gamma_{t,m}$$

Finally, $E_t$ (a Decibel value) may be subtracted from $\Gamma_{t,m}$ to yield:

$$\Delta_{t,m} = \Gamma_{t,m} - E_t,$$

where $E_t$ is the smoothed total energy and $\Delta_{t,m}$ are the smoothed and normalized spectral coefficients.

To determine whether an audio scene is different or unchanged, $E_t$ and $\Delta_{t,m}$ may be compared to thresholds. Typically, most of the spectral energy will fall into the first spectral band, and it is possible to use this assumption to avoid calculating $E_t$ and instead subtract the first spectral band from the others.

The method will trigger a detected change in context, in other words, a context awareness, if any of the following are true:

$$E_t > E_t^{ref} + T_{E,upper}$$

$$E_t < E_t^{ref} - T_{E,lower}$$

$$\Delta_{t,m} > \Delta_{t,m}^{ref} + T_{\Delta,upper}$$

$$\Delta_{t,m} < \Delta_{t,m}^{ref} - T_{\Delta,lower}$$

In the preceding expressions, the T values are thresholds and at present the upper and lower thresholds are set to be the same value. However, it may be worthwhile to preserve the flexibility of keeping the T values m as separate thresholds. The reference values ($E_t^{ref}$ and $\Delta_{t,m}^{ref}$) are also required and these are set to the current values of $E_t$ and $\Delta_{t,m}$ whenever there is a detected change in context. In other words, whenever a new context is detected, the coefficients become the new reference for a subsequent context change.

In some embodiments, the value for energy thresholds is 15 dBs and for $\Delta$ thresholds is 10 dBs.

Thus, the aforementioned context detection method is designed to trigger whenever there is a change in the total energy in the audio (either up or down) or whenever there is a change in the pattern of the audio.

Example Method for Performing Hardware-Based Voice Activity Detection

Figure 6:
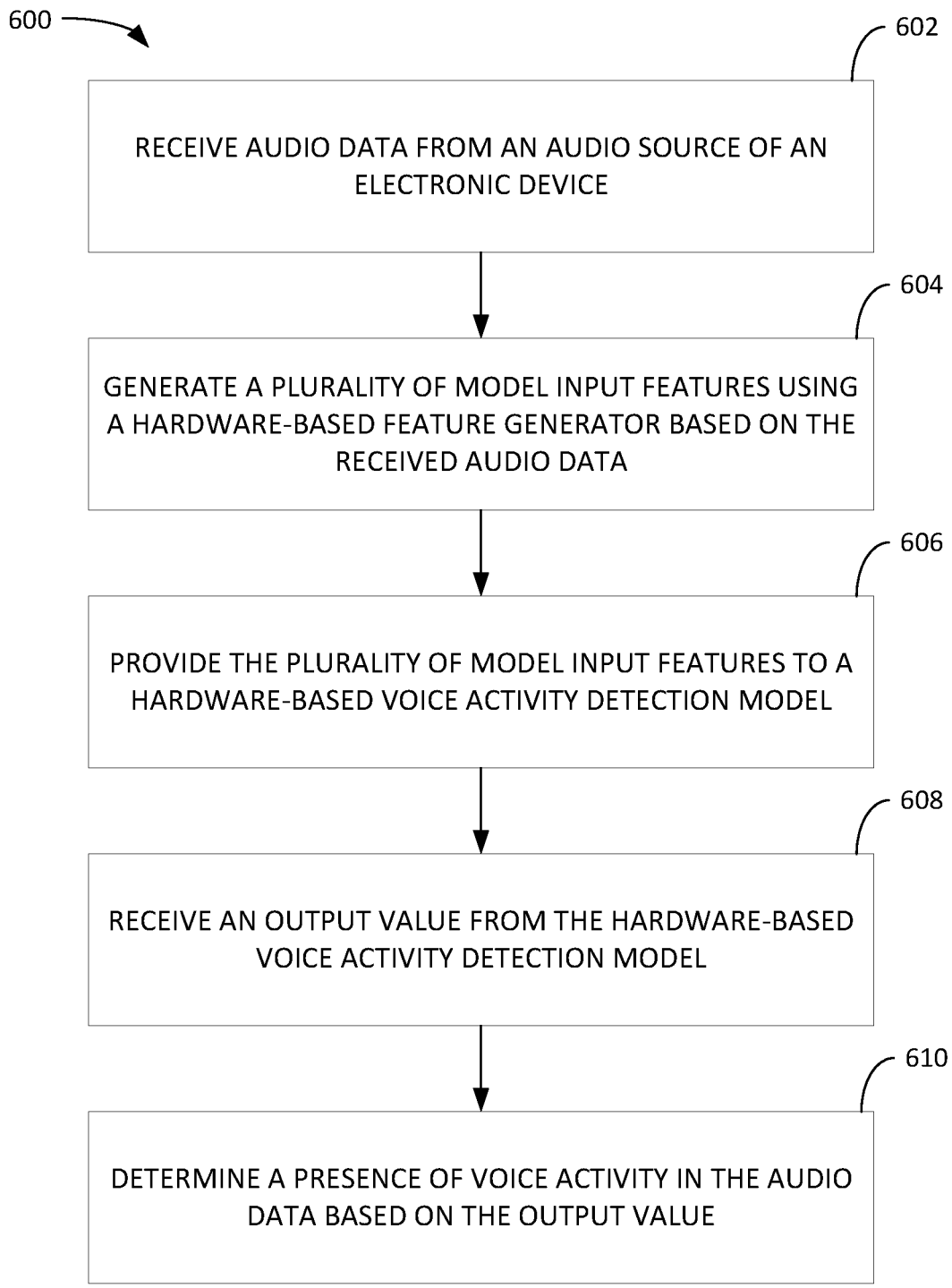
FIG. 6 depicts an example method for performing hardware-based voice activity detection.

FIG. 6 depicts an example method 600 for performing hardware-based voice activity detection.

Method 600 begins at step 602 with receiving audio data from an audio source of an electronic device. In some embodiments, the audio source includes one or more microphones of an electronic device.

Method 600 then proceeds to step 604 with generating a plurality of model input features using a hardware-based feature generator based on the received audio data.

In some embodiments, the hardware-based feature generator comprises a hardware-implemented fast Fourier transformation circuit, such as described above with respect to FIGS. 2 (204) and 3 (312). In some embodiments, the feature generator may be implemented by feature generator circuit 726 in FIG. 7.

In some embodiments, generating the plurality of model input features using a hardware-based feature generator includes one or more of: preprocessing the received audio data to generate domain transformation input data; generating a plurality of band outputs with a domain transformation circuit based on the domain transformation input data; selecting a subset of band outputs from the plurality of band outputs from the domain transformation circuit; and determining a signal to noise ratio for each band output of the subset of band outputs, wherein each signal to noise ratio for each band output is a model input feature, such as described above with respect to FIGS. 2 and 3. In some embodiments, the subset of band outputs comprises eight band outputs.

In some embodiments, preprocessing the received audio data includes one or more of: splitting the received audio data into a first audio data stream and a second audio data stream; applying a delay function to the second audio data stream to generate a delayed second audio data stream; applying a window function to the first audio data stream and the delayed second audio data stream; and applying a serial to parallel conversion to the first audio data stream and the delayed second audio data stream.

In some embodiments, determining the signal to noise ratio for each band output of the subset of band outputs includes one or more of: determining a noise floor for each band output of the subset of band outputs; applying a log function to the noise floor for each band output of the subset of band outputs; determining a signal power level for each band output of the subset of band outputs; and applying the log function to the signal power level for each band output of the subset of band outputs, wherein the signal to noise ratio for each band output of the subset of band outputs comprises a log signal-to-noise ratio, such as described above with respect to FIG. 3 (e.g., SNRs 320A-N).

Method 600 then proceeds to step 606 with providing the plurality of model input features to a hardware-based voice activity detection model. The voice activity detection model may then process the input features based on model parameters (e.g., context-specific model parameters) to generate a model output value.

Method 600 then proceeds to step 608 with receiving an output value from the hardware-based voice activity detection model, such as 324 described above with respect to FIG. 3 or the output of block 416 in FIG. 4.

Method 600 then proceeds to step 610 with determining a presence of voice activity in the audio data based on the output value. In some embodiments, determining voice activity be implemented by a voice activity detector circuit, such as 730 in FIG. 7.

In some embodiments, the hardware-based voice activity detection model comprises a hardware-implemented SVM model, such as, for example, described above with respect to FIGS. 1-4. In some embodiments, the hardware-implemented SVM model includes: a first, multi-column SVM circuit; and a second, single-column SVM circuit configured to generate the output value, such as, for example, described above with respect to FIG. 4.

Figure 7:
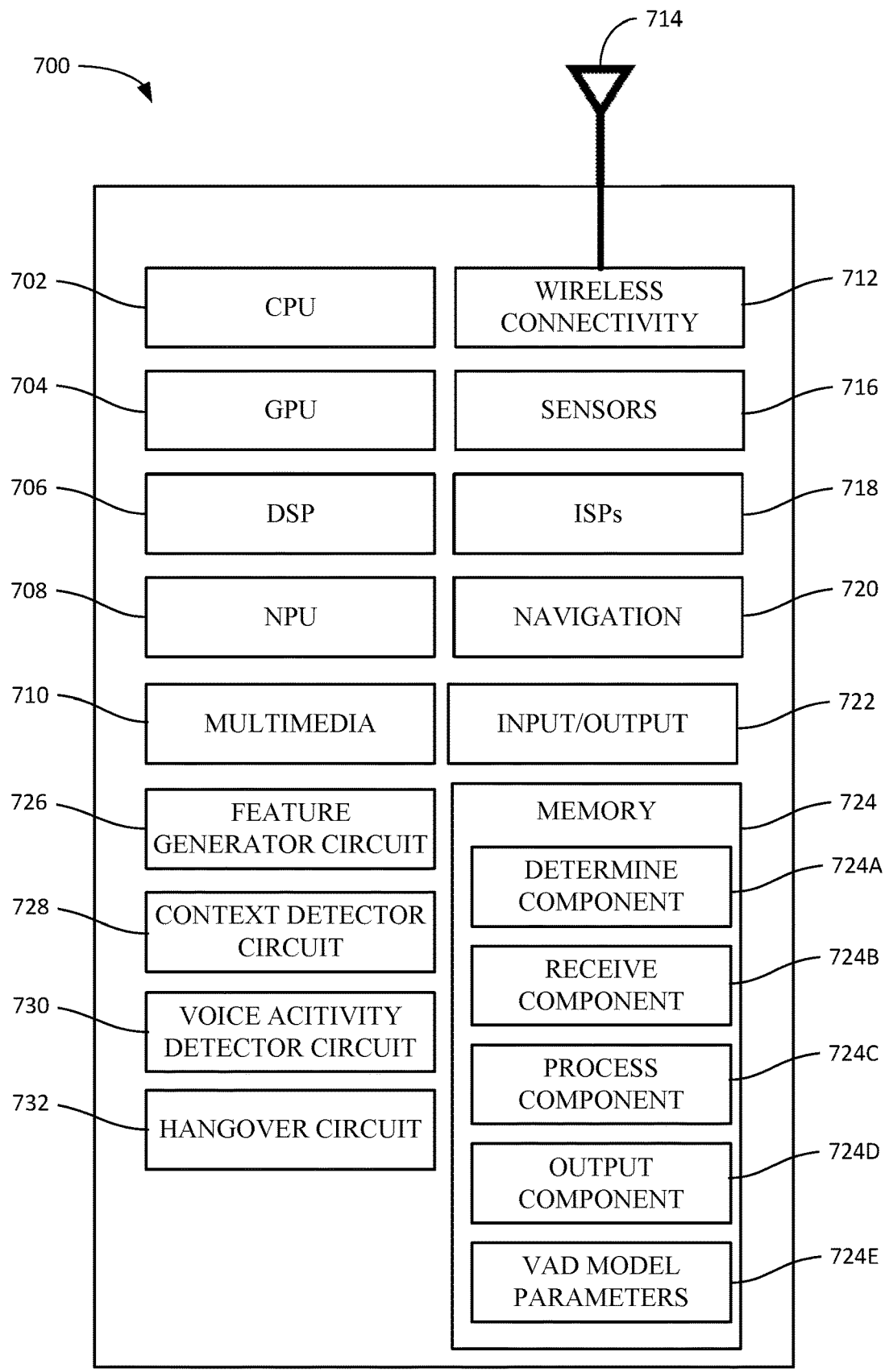
FIG. 7 depicts an example processing system for performing hardware-based voice activity detection.

In some embodiments, method 600 further includes loading a plurality of model parameters for the hardware-implemented SVM model into a memory of the electronic device (e.g., memory 724 in FIG. 7).

In some embodiments, method 600 further includes disabling voice activity detection for a time interval after determining the presence of voice activity in the audio data in order to avoid redundant detections. In some embodiments, the time interval may be referred to as a "hangover interval" and may be implemented, for example, by the hangover circuit 732 in FIG. 7.

In some embodiments, method 600 further includes: determining a context for the audio data; loading context-specific model parameters into the memory of the electronic device; and determining the presence of voice activity in the audio data based on the context-specific model parameters (e.g., where the hardware-based voice activity detection model uses the context-specific model parameters to generate the model output value). In some embodiments, the context detection may be implemented by, for example, context detector circuit 728 in FIG. 7.

Example Processing System for Performing Hardware-Based Voice Activity Detection FIG. 7 depicts an example processing system 700 for performing hardware-based voice activity detection, such as described herein for example with respect to FIG. 6.

Electronic device 700 includes a central processing unit (CPU) 702, which in some examples may be a multi-core CPU. Instructions executed at the CPU 702 may be loaded, for example, from a memory associated with the CPU 702, such as, for example, memory 724.

Electronic device 700 also includes additional processing components tailored to specific functions, such as a graphics processing unit (GPU) 704, a digital signal processor (DSP) 706, a neural processing unit (NPU) 708, a multimedia processing unit 710, and a wireless connectivity component 712.

An NPU, such as NPU 708, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 708 is a part of one or more of CPU 702, GPU 704, and/or DSP 706.

In some examples, wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 712 is further connected to one or more antennas 714.

Electronic device 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

Electronic device 700 may also include one or more input and/or output devices 722, such as screens, touch-sensitive surfaces (including touch-sensitive displays), physical buttons, speakers, microphones, and the like.

In some examples, one or more of the processors of electronic device 700 may be based on an ARM or RISC-V instruction set.

Electronic device 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of electronic device 700.

In particular, in this example, memory 724 includes determine component 724A, receive component 724B, process component 724C, output component 724D, and VAD model parameters 724E. The depicted components, and others not depicted, may be configured to perform various aspects of the methods described herein.

Electronic device 700 further comprises feature generator circuit 726, such as described above with respect to FIGS. 1 (104), 2 (200), and 3 (326).

Electronic device 700 further comprises context detector circuit 728, such as described above with respect to FIG. 1 (106).

Electronic device 700 further comprises voice activity detector circuit 730, such as described above with respect to FIGS. 1 (108), 3 (300), and 4 (400).

Electronic device 700 further comprises feature hangover circuit 732, such as described above with respect to FIG. 6.

Generally, electronic device 700 and/or components thereof may be configured to perform the methods described herein.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system configured for performing voice activity detection, comprising:
   a memory comprising computer-executable instructions; and
   one or more processors configured to execute the computer-executable instructions and cause the processing system to:
   receive audio data from an audio source;
   generate a plurality of model input features using a hardware-based feature generator based on the received audio data, wherein in order to generate the plurality of model input features using the hardware-based feature generator, the one or more processors are configured to cause the processing system to:
preprocess the received audio data to generate domain transformation input data;
generate a plurality of band outputs with a domain transformation circuit based on the domain transformation input data,
determine a current context associated with the audio data based on spectral coefficients associated with the received audio data and spectral coefficients associated with a prior context associated with an audio environment in which previous audio data was captured, wherein in order to determine the current context, the one or more processors are configured to cause the processing system to:
  determine that the current context is unchanged relative to the prior context when the spectral coefficients associated with the received audio data are within a threshold distance from the spectral coefficients associated with the prior context, or
  determine that the current context is different from the prior context when the spectral coefficients associated with the received audio data are outside the threshold distance from the spectral coefficients associated with the prior context;
select a subset of band outputs from the plurality of band outputs from the domain transformation circuit by filtering symmetric band outputs from the plurality of band outputs, wherein the subset of band outputs comprises fewer band outputs than the plurality of band outputs; and
determine a signal-to-noise ratio for each band output of the subset of band outputs, wherein each signal-to-noise ratio for each band output of the subset of band outputs is a model input feature of the plurality of model input features; and
determine a presence of voice activity in the audio data based on an output value generated by a hardware-based voice activity detection model based on the model input features, wherein the hardware-based voice activity detection model comprises a model including context-specific model parameters associated with the determined current context associated with the audio data.

2. The processing system of claim 1, wherein the hardware-based feature generator comprises a hardware-implemented fast Fourier transformation circuit.

3. The processing system of claim 1, wherein in order to determine the signal-to-noise ratio for each band output of the subset of band outputs, the one or more processors are further configured to cause the processing system to:
determine a noise floor for each band output of the subset of band outputs;
apply a log function to the noise floor for each band output of the subset of band outputs;
determine a signal power level for each band output of the subset of band outputs; and
apply the log function to the signal power level for each band output of the subset of band outputs, wherein the signal-to-noise ratio for each band output of the subset of band outputs comprises a log signal-to-noise ratio.

4. The processing system of claim 1, wherein in order to preprocess the received audio data, the one or more processors are further configured to cause the processing system to:
split the received audio data into a first audio data stream and a second audio data stream;
apply a delay function to the second audio data stream to generate a delayed second audio data stream;
apply a window function to the first audio data stream and the delayed second audio data stream; and
apply a serial-to-parallel conversion to the first audio data stream and the delayed second audio data stream.

5. The processing system of claim 1, wherein the hardware-based voice activity detection model comprises a hardware-implemented support vector machine (SVM) model.

6. The processing system of claim 5, wherein the hardware-implemented SVM model comprises:
a first, multi-column SVM circuit; and
a second, single-column SVM circuit configured to generate the output value.

7. The processing system of claim 5, wherein the one or more processors are further configured to cause the processing system to: load a plurality of model parameters for the hardware-implemented SVM model into the memory.

8. The processing system of claim 1, wherein the subset of band outputs comprises eight band outputs.

9. The processing system of claim 1, wherein the audio source comprises one or more microphones of the processing system.

10. A method for performing voice activity detection, comprising:
receiving audio data from an audio source of an electronic device;
generating a plurality of model input features using a hardware-based feature generator based on the received audio data, wherein generating the plurality of model input features comprises:
  preprocessing the received audio data to generate domain transformation input data;
  generating a plurality of band outputs with a domain transformation circuit based on the domain transformation input data;
  determining a current context associated with the audio data based on spectral coefficients associated with the received audio data and spectral coefficients associated with a prior context associated with an audio environment in which previous audio data was captured, wherein determining the current context comprises:
    determining that the current context is unchanged relative to the prior context when the spectral coefficients associated with the received audio data are within a threshold distance from the spectral coefficients associated with the prior context, or
    determining that the current context is different from the prior context when the spectral coefficients associated with the received audio data are outside the threshold distance from the spectral coefficients associated with the prior context;
  selecting a subset of band outputs from the plurality of band outputs from the domain transformation circuit by filtering symmetric band outputs from the plurality of band outputs, wherein the subset of band outputs comprises fewer band outputs than the plurality of band outputs; and
  determining a signal-to-noise ratio for each band output of the subset of band outputs, wherein each signal-to-noise ratio for each band output of the subset of band outputs is a model input feature of the plurality of model input features; and
determining a presence of voice activity in the audio data based on an output value generated by a hardware-based voice activity detection model based on the model input features, wherein the hardware-based voice activity detection model comprises a model including context-specific model parameters associated with the determined current context associated with the audio data.

11. The method of claim 10, wherein the plurality of model input features comprises a smoothed energy measurement and a set of smoothed spectral coefficients.

12. The method of claim 10, wherein the hardware-based feature generator comprises a hardware-implemented fast Fourier transformation circuit.

13. The method of claim 10, wherein determining the signal-to-noise ratio for each band output of the subset of band outputs comprises:
   determining a noise floor for each band output of the subset of band outputs;
   applying a log function to the noise floor for each band output of the subset of band outputs;
   determining a signal power level for each band output of the subset of band outputs; and
   applying the log function to the signal power level for each band output of the subset of band outputs, wherein the signal-to-noise ratio for each band output of the subset of band outputs comprises a log signal-to-noise ratio.

14. The method of claim 10, wherein preprocessing the received audio data comprises:
   splitting the received audio data into a first audio data stream and a second audio data stream;
   applying a delay function to the second audio data stream to generate a delayed second audio data stream;
   applying a window function to the first audio data stream and the delayed second audio data stream; and
   applying a serial-to-parallel conversion to the first audio data stream and the delayed second audio data stream.

15. The method of claim 10, wherein the hardware-based voice activity detection model comprises a hardware-implemented support vector machine (SVM) model.

16. The method of claim 15, wherein the hardware-implemented SVM model comprises:
   a first, multi-column SVM circuit; and
   a second, single-column SVM circuit configured to generate the output value.

17. The method of claim 15, further comprising: loading a plurality of model parameters for the hardware-implemented SVM model into a memory of the electronic device.

18. The method of claim 10, wherein the subset of band outputs comprises eight band outputs.

19. The method of claim 10, wherein the audio source comprises one or more microphones of the electronic device.

20. A non-transitory computer-readable medium comprising computer-executable instructions that, when executed by one or more processors of a processing system, cause the processing system to perform a method for performing voice activity detection, the method comprising:
   receiving audio data from an audio source of an electronic device;
   generating a plurality of model input features using a hardware-based feature generator based on the received audio data, wherein generating the plurality of model input features comprises:
      preprocessing the received audio data to generate domain transformation input data;
      generating a plurality of band outputs with a domain transformation circuit based on the domain transformation input data;
      determining a current context associated with the audio data based on spectral coefficients associated with the received audio data and spectral coefficients associated with a prior context associated with an audio environment in which previous audio data was captured, wherein determining the current context comprises:
         determining that the current context is unchanged relative to the prior context when the spectral coefficients associated with the received audio data are within a threshold distance from the spectral coefficients associated with the prior context, or
         determining that the current context is different from the prior context when the spectral coefficients associated with the received audio data are outside the threshold distance from the spectral coefficients associated with the prior context;
      selecting a subset of band outputs from the plurality of band outputs from the domain transformation circuit by filtering symmetric band outputs from the plurality of band outputs, wherein the subset of band outputs comprises fewer band outputs than the plurality of band outputs; and
      determining a signal-to-noise ratio for each band output of the subset of band outputs, wherein each signal-to-noise ratio for each band output of the subset of band outputs is a model input feature of the plurality of model input features; and
   determining a presence of voice activity in the audio data based on an output value generated by a hardware-based voice activity detection model based on the model input features, wherein the hardware-based voice activity detection model comprises a model including context-specific model parameters associated with the determined current context associated with the audio data.

21. The non-transitory computer-readable medium of claim 20, wherein the hardware-based feature generator comprises a hardware-implemented fast Fourier transformation circuit.

22. The non-transitory computer-readable medium of claim 20, wherein determining the signal-to-noise ratio for each band output of the subset of band outputs comprises:
   determining a noise floor for each band output of the subset of band outputs;
   applying a log function to the noise floor for each band output of the subset of band outputs;
   determining a signal power level for each band output of the subset of band outputs; and
   applying the log function to the signal power level for each band output of the subset of band outputs, wherein the signal-to-noise ratio for each band output of the subset of band outputs comprises a log signal-to-noise ratio.

23. The non-transitory computer-readable medium of claim 20, wherein preprocessing the received audio data comprises:
   splitting the received audio data into a first audio data stream and a second audio data stream;
   applying a delay function to the second audio data stream to generate a delayed second audio data stream;
   applying a window function to the first audio data stream and the delayed second audio data stream; and
   applying a serial-to-parallel conversion to the first audio data stream and the delayed second audio data stream.

24. The non-transitory computer-readable medium of claim 20, wherein the hardware-based voice activity detection model comprises a hardware-implemented support vector machine (SVM) model.

25. The non-transitory computer-readable medium of claim 24, wherein the hardware-implemented SVM model comprises:
a first, multi-column SVM circuit; and
a second, single-column SVM circuit configured to generate the output value.

26. The non-transitory computer-readable medium of claim 24, wherein the method further comprises: loading a plurality of model parameters for the hardware-implemented SVM model into a memory of the electronic device.

27. The non-transitory computer-readable medium of claim 20, wherein the subset of band outputs comprises eight band outputs.

28. A processing device, comprising:
means for receiving audio data from an audio source of an electronic device;
means for generating a plurality of model input features using a hardware-based feature generator based on the received audio data, wherein the means for generating the plurality of model input features comprises:
 means for preprocessing the received audio data to generate domain transformation input data;
 means for generating a plurality of band outputs with a domain transformation circuit based on the domain transformation input data,
 means for determining a current context associated with the audio data based on spectral coefficients associated with the received audio data and spectral coefficients associated with a prior context associated with an audio environment in which previous audio data was captured, wherein the means for determining the current context is configured to:
  determine that the current context is unchanged relative to the prior context when the spectral coefficients associated with the received audio data are within a threshold distance from the spectral coefficients associated with the prior context, or
  determine that the current context is different from the prior context when the spectral coefficients associated with the received audio data are outside the threshold distance from the spectral coefficients associated with the prior context;
 means for selecting a subset of band outputs from the plurality of band outputs from the domain transformation circuit by filtering symmetric band outputs from the plurality of band outputs, wherein the subset of band outputs comprises fewer band outputs than the plurality of band outputs; and
 means for determining a signal-to-noise ratio for each band output of the subset of band outputs, wherein each signal-to-noise ratio for each band output of the subset of band outputs is a model input feature of the plurality of model input features;
means for providing the plurality of model input features to a hardware-based voice activity detection model, wherein the hardware-based voice activity detection model comprises a model including context-specific model parameters associated with the determined current context associated with the audio data;
means for receiving an output value from the hardware-based voice activity detection model; and
means for determining a presence of voice activity in the audio data based on the output value.

* * * * *